June 12, 1956     F. W. McCONNEL     2,749,916
ROTORS FOR THRESHING MACHINES

Filed Aug. 22, 1952     3 Sheets-Sheet 1

INVENTOR
Frederic W. McConnel

By Watson, Cole, Grindle & Watson
ATTORNEYS

June 12, 1956   F. W. McCONNEL   2,749,916
ROTORS FOR THRESHING MACHINES
Filed Aug. 22, 1952   3 Sheets-Sheet 2

INVENTOR
Frederic W. McConnel
By Watson, Cole, Grindle & Watson
ATTORNEYS

June 12, 1956  F. W. McCONNEL  2,749,916
ROTORS FOR THRESHING MACHINES
Filed Aug. 22, 1952  3 Sheets-Sheet 3

INVENTOR
Frederic W. McConnel
By Watson, Cole, Grindle & Watson
ATTORNEYS

United States Patent Office 2,749,916
Patented June 12, 1956

2,749,916

ROTORS FOR THRESHING MACHINES

Frederic Whigham McConnel, Pensax, England, assignor to McConnel Bomford Limited, Pensax, England, a British company Application August 22, 1952, Serial No. 305,787

4 Claims. (Cl. 130—27)

This invention relates to rotors for threshing machines and particularly for threshing machines which beat the seed or the grain from standing crops, such as is described in prior British specifications Nos. 572,040 and 655,330. The rotors are of the kind comprising a number of sets of beater arms arranged side-by-side on a rotatable shaft and so arranged that the heads of seed or grain may pass between the beater arms of adjacent sets, and in so doing are hit from side to side, first being hit by a beater of one set and then by a beater of an adjacent set followed by another beater of the original set and so on.

According to this invention a rotor of the kind referred to for a threshing machine is characterised in that each set of beater arms comprises a number of wires or rods radiating from the axis of rotation of the rotor, each of which rods in one set diverges from a nearby rod in an adjacent set as it extends outwardly so as to provide wedge-shaped spaces into which the heads of seeds or grain may enter. Preferably the wires or rods in one set are staggered in a circumferential direction from the rods and wires of an adjacent set.

In one construction according to this invention, each set of beater arms comprises a number of looped wires or rods arranged with their planes radiating from the axis of rotation of the rotor which loops are arranged with the closed end outermost and are so shaped that a limb of each loop diverges from an adjacent set of loops as said limb extends outwardly from said axis so as to provide wedge-shaped spaces into which the heads of seed or grain may enter. Preferably, the planes of the loops are parallel with and intersect the axis of rotation of the rotor.

In an alternative construction, said wires or rods are so disposed and arranged as to form interrupted loops.

In the case where the rotor is used in a threshing machine having a casing which partly surrounds the rotor and in which the rotor is arranged to form an impeller which blows the separated seed or grain through an outlet conduit leading from said casing, blades are mounted at the ends of said loops so as to promote a flow of air round the casing. Preferably, the blades are arranged to lie in the respective planes of said loops.

In the case where each loop is a continuous one, a blade is secured to each loop. In the case where each loop is interrupted, each blade is mounted on a rod radiating outwardly between the two rods constituting an interrupted loop.

The following is a description of a number of rotors for use with a threshing machine, reference being made to the accompanying drawings, in which.

Figure 1:
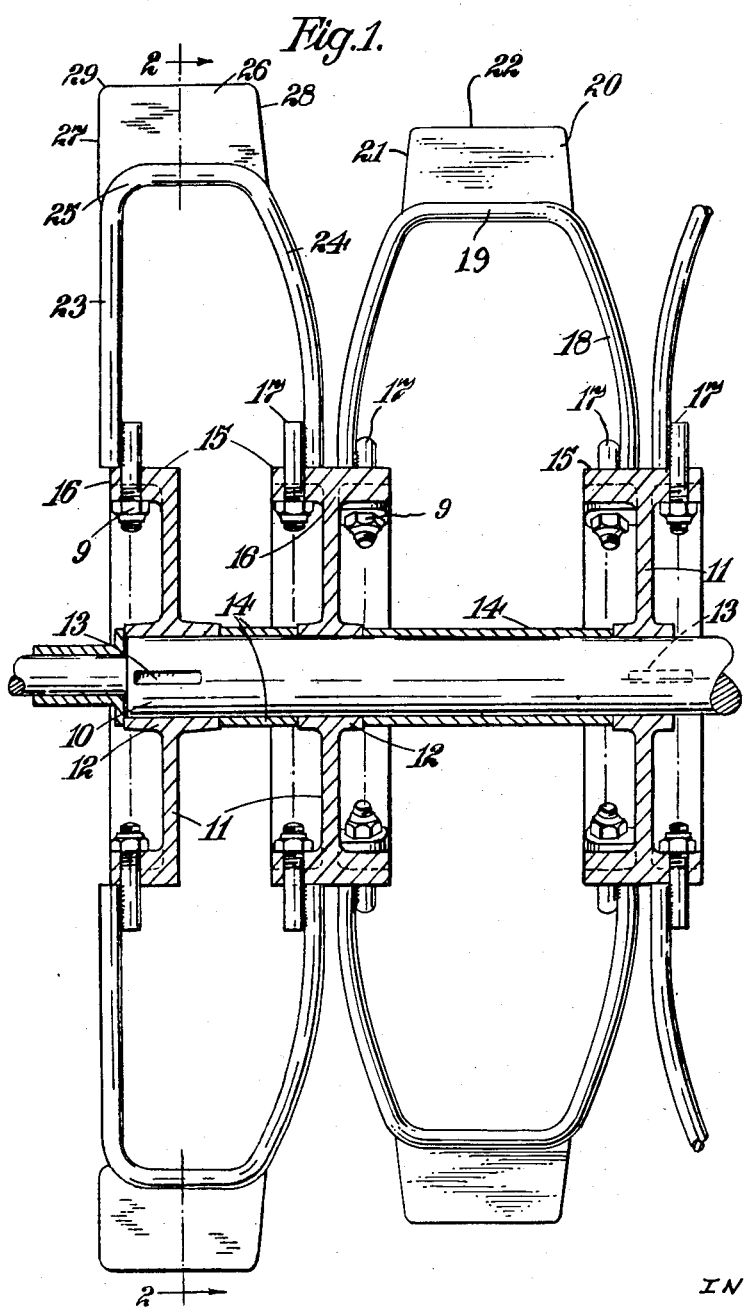
Figure 1 is a section through the rotor in a plane containing the axis thereof.
Figure 2:
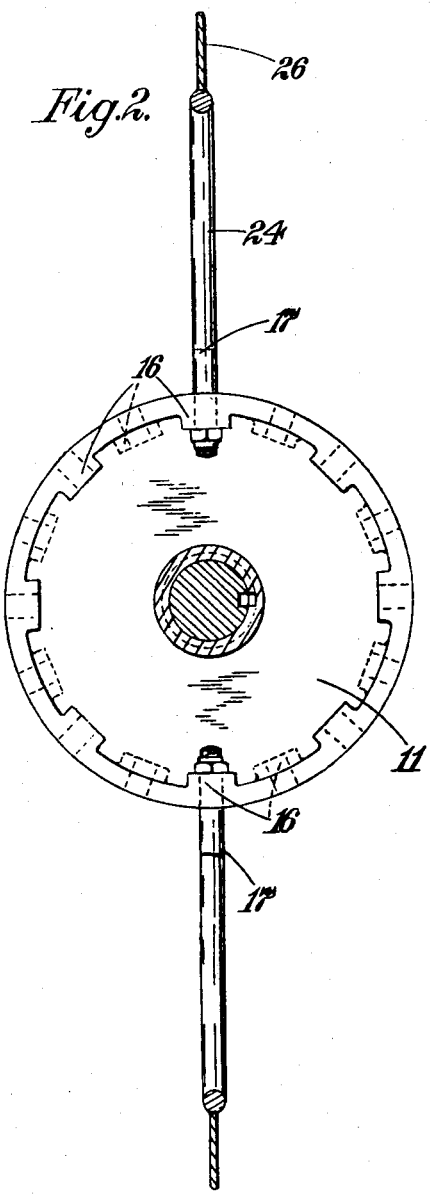
Figure 2 is a section on the line 2—2 of Figure 1 looking in the direction of the arrow.

In the construction shown in Figures 1 and 2, there are spaced apart on a driving shaft 10 a number of hub discs 11 of cast aluminium alloy 12 having hollow bosses at their centres which encircle and are keyed to the driving shaft at 13 and are spaced apart by spacer tubes 14 and which discs and spacing tubes together constitute the hub. Each disc is provided with a circumferential flange 15 which in the case of the intermediate disc extends on either side of the disc, while in the case of each outer disc the flange extends only on the outer side. The inner circumferential faces of the flanges are provided with a number of bosses 16 spaced apart around the circumference thereof, which bosses and flanges are drilled to receive comparatively short studs 17 which are welded to the extremities of the limbs 18 of the loops and are provided with threaded portions which are engaged by nuts 9. Thus, each loop is arranged to extend from the flange on one disc to the flange on a neighbouring disc, and the studs 17 for two sets of loops are so disposed on each flange 15 that the extremities of the two sets of limbs may lie close to and on opposite sides of the central plane of the discs. The loops for the intermediate sets are so shaped that the two limbs 18 on each loop converge as they extend outwardly and are curved with comparatively large radii of curvature and are joined at their outer extremities by a straight portion 19 to which a sheet-metal blade 20 is welded. The blade is provided with converging side edges 21 which join a straight end edge 22. Each loop of each outer set has a straight limb 23 disposed at right-angles to the axis of rotation and a curved limb 24 as described above, which two limbs join a straight portion 25 to which a blade 26 is secured. The blade has a radial side edge 27 and an inclined side edge 28 which join a straight end edge 29 parallel with the axis of rotation.

As will be seen from Figure 2 the bosses on opposite sides of each disc are arranged in staggered relationship so that the loops of one set are arranged in staggered relationship to an adjacent set.

Figure 3:
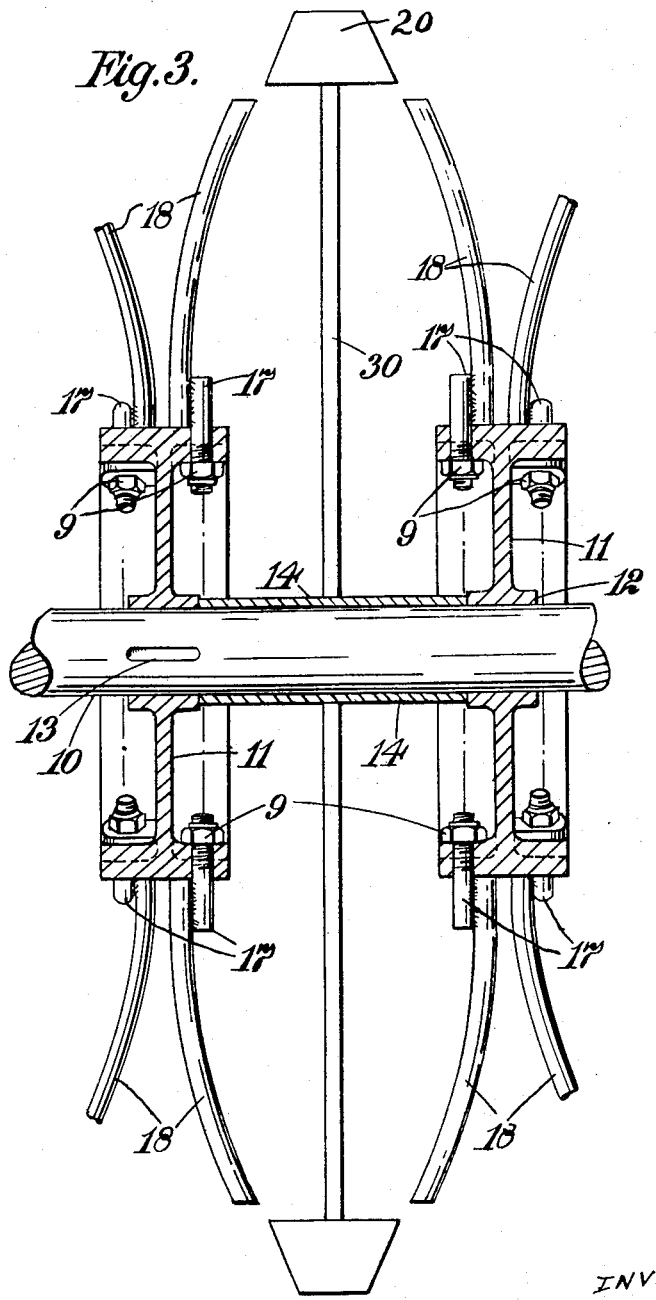
Figure 3 is a similar view to Figure 1 of an alternative form of rotor.

In the arrangement shown in Figure 3 instead of the rotor being provided with loops it is provided with a number of outwardly extending rods 18 secured to the aforesaid flanges 15 which rods are curved so that those on one disc extend towards those on an adjacent disc and form, so to speak, interrupted loops. Thus each flange 15 is provided with two sets of curved rods, which diverge, as they extend outwardly. Also instead of the blades 20 being secured to the rods 18 they are secured to rods 30 which extend radially from the tubular spacing members 14.

I claim:

1. A rotor for threshing grain comprising a rotatable hub, a number of sets of rods fixed to the hub, which sets are spaced axially apart along the length of the hub and each comprises a number of rods spaced around the circumference of the hub, the roots of which rods in each set are arranged on a circle spaced axially from a circle containing the roots of a neighboring set of rods, the rods in one set being staggered in a circumferential direction with respect to the rods in an adjacent set so that the rod in one set lies substantially midway between two rods of an adjacent set and each of which rods in a set diverges from a nearby rod in an adjacent set from their roots outward, so as to provide wedge-shaped spaces extending close to the hub into which the heads of grain may enter.

2. A rotor for threshing grain comprising a rotatable hub, a number of sets of looped rods fixed to the hub, which sets are spaced axially apart along the length of the hub and each comprises a number of looped rods spaced around the circumference of the hub, the roots of which rods in each set are arranged on a circle spaced axially from a circle containing the roots of a neighboring set of rods, the rods in one set being staggered in a circumferential direction with respect to the rods in an adjacent set so that the rod in one set lies substantially midway between two rods of an adjacent set and each of which rods in a set diverges from a nearby rod in an adjacent set from their roots outward, so as to provide wedge-shaped spaces extending close to the hub into which the heads of grain may enter.

3. A rotor for threshing grain comprising a rotatable hub, a number of sets of looped rods fixed to the hub, which sets are spaced axially apart along the length of the hub and each comprises a number of looped rods spaced around the circumference of the hub, a blade fixed to the extremities of each looped rod, the roots of which rods in each set are arranged on a circle spaced axially from a circle containing the roots of a neighboring set of rods, the rods in one set being staggered in a circumferential direction with respect to the rods in an adjacent set so that the rod in one set lies substantially midway between two rods of an adjacent set and each of which rods in a set diverges from a nearby rod in an adjacent set from their roots outward, so as to provide wedge-shaped spaces extending close to the hub into which the heads of grain may enter.

4. A rotor for threshing grain comprising a rotatable hub, a number of sets of interrupted looped rods fixed to the hub, which sets are spaced axially apart along the length of the hub and each comprises a number of interrupted looped rods spaced around the circumference of the hub, the roots of which rods in each set are arranged on a circle spaced axially from a circle containing the roots of a neighboring set of rods, the rods in one set being staggered in a circumferential direction with respect to the rods in an adjacent set so that the rod in one set lies substantially midway between two rods of an adjacent set and each of which rods in a set diverges from a nearby rod in an adjacent set from their roots outward, so as to provide wedge-shaped spaces extending close to the hub into which the heads of grain may enter.

References Cited in the file of this patent

UNITED STATES PATENTS

| Number | Name | Date |
|---|---|---|
| 964,966 | Guy-Bernard | July 19, 1910 |
| 1,251,425 | Rodgers et al. | Dec. 25, 1917 |
| 2,495,417 | McConnel et al. | Jan. 24, 1950 |
| 2,620,614 | McConnel et al. | Dec. 9, 1952 |